United States Patent [19] [11] 4,308,357
Kaus et al. [45] Dec. 29, 1981

[54] BLOCK COPOLYMERIZATION PROCESS AND PRODUCT

[75] Inventors: Malcolm J. Kaus, Mohegan Lake, N.Y.; Birendra K. Patnaik, Parsippany, N.J.

[73] Assignee: El Paso Polyolefins Company, Paramus, N.J.

[21] Appl. No.: 198,749

[22] Filed: Oct. 20, 1980

[51] Int. Cl.³ .......................................... C08F 297/08
[52] U.S. Cl. .................................. 525/247; 525/323
[58] Field of Search ........................ 525/245, 323, 247

[56] References Cited

U.S. PATENT DOCUMENTS

| | | | |
|---|---|---|---|
| 3,318,976 | 5/1967 | Short | 525/323 |
| 3,378,607 | 4/1968 | Jones et al. | 525/323 |
| 3,514,501 | 5/1970 | Leibson et al. | 525/53 |
| 3,830,787 | 8/1974 | Susa et al. | 526/125 |
| 3,953,414 | 4/1976 | Galli et al. | 526/125 |
| 4,051,313 | 9/1977 | Luciani et al. | 528/496 |
| 4,115,319 | 9/1978 | Soata et al. | 526/125 |
| 4,149,990 | 4/1979 | Giannini et al. | 526/122 |

Primary Examiner—Stanford M. Levin
Attorney, Agent, or Firm—Fred S. Valles; Margareta LaMaire

[57] ABSTRACT

A process for the preparation of ethylene-propylene block copolymers at high catalyst productivity rates resulting in polymer products having improved impact strength-polymerized ethylene content relationship.

24 Claims, No Drawings

BLOCK COPOLYMERIZATION PROCESS AND PRODUCT

BACKGROUND OF THE INVENTION

In block polymerization, there is substantially effected a combination of the best physical and chemical properties of two or more polymers, for example, the combination of those of polypropylene with those of polyethylene. Thus, polyethylene, while not possessing melting points or tensile strengths as high as those of polypropylene, does in fact possess excellent low temperature properties such as brittleness and impact. When the outstanding properties of both of these polymers are combined in the technique of block polymerization, there results at once a heteropolymer useful in many applications for which neither homopolymer was practically useful.

A group of block copolymers, which have excellent physical properties, are the ethylene-propylene block copolymers, e.g. those of the type P-EP, where P denotes a propylene homopolymer preblock and EP is a post-block of ethylene-propylene copolymer. By varying the proportions of the blocks and the polymerized ethylene content, the physical properties can be closely controlled to fit the particular application for which the polymer products are intended. In general, at constant melt flow rates the impact strength at room temperature of the block copolymer is substantially directly proportional to the amount of polymerized ethylene in the total product.

Block copolymers are advantageously produced on a commercial scale by the process disclosed in U.S. Pat. No. 3,514,501. Briefly, this process involves preparation of the preblock, preferably in the liquid phase, by catalytic polymerization of propylene in a hydrocarbon diluent such as liquid propylene to form a slurry. After separation of the slurry, the prepolymer which still contains active catalyst residues is introduced into at least one reaction zone, where it is reacted with monomer vapors for a sufficient period of time to form the polymer post block onto the polymer preblock in the desired proportions.

In the past, the conventional catalyst system used in such a polymerization process has been an unmodified or an electron donor-modified titanium halide component, activated with an organoaluminum cocatalyst. Typical examples of conventional propylene polymerization catalyst systems include cocrystallized titanium trichloride-aluminum trichloride catalysts of the general formula $n.TiCl_3.AlCl_3$ activated with diethyl aluminum chloride or triethyl aluminum. The cocrystallized titanium trichloride-aluminum trichloride can have been subjected to a modification treatment with a suitable electron donor compound to increase its activity or stereospecificity. Such compounds include phosphorus compounds, esters of inorganic and organic acid ethers and numerous other compounds.

One major drawback, however, in using the aforementioned conventional catalysts, has been the low catalyst productivity, which has necessitated the subsequent deashing of the product to reduce the content of catalyst residues, which otherwise would detrimentally affect the product quality.

Recently new catalysts have been developed which are far more active than the aforementioned conventional catalysts in the polymerization of alpha-olefins. Briefly described, these catalysts are comprised of a titanium halide catalyst component supported on magnesium dihalide and an alkylaluminum compound, which can be present as a complex with an electron donor compound. These catalyst components have been described in the patent literature, e.g. in U.S. Pat. Nos. 3,830,787; 3,953,414; 4,051,313; 4,115,319 and 4,149,990.

The productivities obtained with these new catalysts are extremely high resulting in polymers containing such small quantities of residual catalyst that the conventional deashing step can be dispensed with. The catalysts function well in the homopolymerization of propylene and in the copolymerization of a mixture of propylene and another alpha-olefin such as ethylene, provided that the polymerization reaction is carried out in a liquid diluent, e.g. liquid propylene monomer. However, in the vapor phase polymerization used in preparing the EP copolymer block of P-EP block copolymer described above, using conventional operating conditions, it has been found that the product quality of the resulting block polymer has been substantially inferior. Specifically, in order to achieve a desired melt flow, it was found that considerably more ethylene had to be incorporated into the total polymer than is the case when employing conventional catalysts. The necessary increase in ethylene content to achieve the impact strength detrimentally affects other desirable properties of the final product such as stiffness, heat deflection temperature, tensile properties, etc.

As disclosed in copending U.S. patent application Ser. No. 64,961 filed July 27, 1979, significant improvements in impact strength can be achieved when the vapor phase polymerization is carried out with a monomer feed having an ethylene-to-propylene molar ratio in the narrow range of from about 0.15 to about 0.3. However, it has been found that at these rather low molar ratios, the total amount of ethylene that can be incorporated into the final product is somewhat restricted. Thus, the aforementioned improved process has been limited to the production of relatively low impact strength.

It is therefore an object of the present invention to provide a highly efficient process for the polymerization of ethylene-propylene blocks onto a preformed propylene polymer yielding medium to high-impact grade polymer products without significantly affecting other desirable physical polymer properties.

Another object of the invention is to provide a process for the preparation of ethylene-propylene block copolymers wherein the polymerized ethylene content of the total polymer product is minimized to achieve a desired impact strength.

Still another object of the present invention is to provide a novel ethylene-propylene block copolymer of higher impact strength than that of a conventionally prepared ethylene-propylene block copolymer of same polymerized ethylene content.

Further objects will become apparent from a reading of the specifications and appended claims.

THE INVENTION

The above objects are accomplished in sequential block copolymerization process which comprises:
I. In a first stage producing a propylene prepolymer by polymerizing propylene at pressures sufficient to maintain propylene in liquid phase and at temperatures between about 115° F. and about 165° F.

in the presence of a catalyst composition containing the components
  (a) an aluminum trialkyl or an aluminum trialkyl at least partially complexed with an electron donor compound, and
  (b) titanium tri- or tetrahalide supported on magnesium dihalide, or a complex of a titanium tri- or tetrahalide with an electron donor compound supported on magnesium dihalide, the components (a) and (b) being provided in a molar ratio of Al/Ti between about 10 and about 400;
II. in second stage contacting the prepolymer of the first stage with a monomer mixture of ethylene and propylene at a pressure sufficient to maintain propylene in liquid phase and at a temperature between about 115° F. and about 165° F., and
III. separating the product of step II from the unreacted monomer.

It was unexpectedly discovered that when the block copolymerization step i.e. the second stage of the process of this invention, is carried out under sufficient pressure to maintain propylene in the liquid phase, it is possible not only to increase the ethylene incorporation into the polymer, but also to obtain an improved impact strength-polymerized ethylene relationship in the polymer product.

The process can be carried out in batch wise, semi-continuous or continuous fashion using one or two reaction vessels for the polymerization stages.

The prepolymer is formed in the first stage employing liquid propylene as diluent and a catalyst for the polymerization carrying out the polymerization to a polymer solids content of from 5 to 60%, but preferably 10 to 40%. The propylene functions as the liquid diluent as well as feed to the reaction, except for small quantities of inert hydrocarbons, e.g. hexane, mineral oil, petrolatum, etc., that may be used for the introduction of the catalyst components into the reaction zone. Minor amounts of other alpha-olefins of from 2 to 10 carbon atoms can be used in admixture with the propylene to form the prepolymer. Such other alpha-olefins include ethylene, butene-1, isobutene-1, pentene-1, hexene-1. and higher, as well as branched alpha-olefins such as 2-methyl butene-1, 4-methyl pentene-1 and higher. Of these monomers, propylene and mixtures of propylene and ethylene are of special interest and most preferred. When ethylene is a component, it is preferred that it be limited to a concentration of not more than about 2 wt% of the total monomer feed.

The catalyst components used the process for preparing the prepolymer can be any one of the recently developed, high activity magnesium halide supported catalyst components and organoaluminum cocatalyst components disclosed e.g. in U.S. Pat. No. 3,830,787; 3,953,414; 4,015,313; 4,115,319 and 4,149,990, hereby incorporated in this application by reference.

Typically, such a catalyst composition is a two component composition where the components are introduced separately into the polymerization reactor. Component (a) of such a composition is advantageously selected from trialkyl aluminum containing from 1 to 8 carbon atoms in the alkyl group, such as triethyl aluminum, trimethyl aluminum, tri-n-butyl aluminum, tri-isobutyl aluminum, triisohexyl aluminum, tri-n-octyl aluminum and tri-isooctyl aluminum. Most preferably, the trialkyl aluminum is complexed with an electron donor prior to introduction into the polymerization reactor. Best results are achieved when esters of carboxylic acids or diamines, particularly esters of aromatic acids, are used as the electron donors.

Some typical examples of such compounds are methyl- and ethylbenzoate, methyl- and ethyl-p-methoxybenzoate, diethylcarbonate, ethylacetate, dimethylmaleate, triethylborate, ethyl-o-chlorobenzoate, ethylnaphthenate, methyl-p-toluate, ethyltoluate, ethyl-p-butoxy-benzoate, ethyl-cyclohexanoate, ethylpivalate, N,N,N',N'-tetramethylenediamine, 1,1,4, -trimethylpiperazine, 2,5-dimethylpiperazine and the like. The molar ratio of aluminum alkyl to electron donor can range between 1 and 100, preferably between 2 and 5. Solutions of the electron donor and the trialkyl aluminum compound in a hydrocarbon such as hexane or heptane are preferably prereacted for a certain period of time generally less than 1 hour prior to feeding the mixture into the polymerization reaction zone.

The other component of the catalyst composition is either a titanium tri- or tetrahalide supported on magnesium dihalide, or a complex of a titanium tri- or tetrahalide with an electron donor compound supported on magnesium dihalide. The halogen in the respective halides can be chlorine, bromine or iodine, the preferred halogen being chlorine. The electron donor, if it is used in forming complex, is suitably selected from the esters of inorganic and organic oxygenated acids and the polyamines. Examples of such compounds are the esters of aromatic carboxylic acids, such as benzoic acid, p-methoxybenzoic acid and p-toluic acids and particularly the alkyl esters of said acids; the alkylene diamine, e.g. N',N'',N''',N''''-tetramethylethylenediamine The magnesium to electron donor molar ratio are equal to or higher than 1 and preferably between 2 and 10. Generally, the titanium content expressed as titanium metal ranges between 0.1 and 20 wt % in the supported catalyst component and preferably between 1 and 3 wt %.

The preparation of such supported catalyst components has been described in the prior art and are commercially available.

The catalyst components (a) and (b) are fed to the prepolymer reaction zone in amounts such that the Al/Ti molar ratio is maintained preferably between about 10 and 400. The monomer feed to Ti metal weight ratio is usually in the range of 500,000 and 1,500,000.

Temperatures at which the prepolymer formation can be carried out are those known in the art, for example, from 50° to 250° F., preferably from 115° to 165° F. and most preferably from 125° F. to about 155° F. The pressures used in the reaction can range up to about 500 psig and even higher.

The residence time of the first stage polymerization should not exceed about 30 minutes and preferably should be maintained within the range of from about 5 to about 20 minutes.

In the second stage the prepolymer is contacted with a mixture of ethylene and propylene having an average ethylene-concentration in the range from about 0.5 to about 6 mole % and preferably between about 1 and about 4 mole %. The temperature and pressure conditions are maintained within the ranges specified for the preparation of the prepolymer in the first stage and are usually similar to those of the first stage although dissimilar conditions can be used if so desired. The residence time of the second stage polymerization is generally maintained between about 30 and about 450 minutes, preferably between about 60 and about 200 minutes.

Various modifiers such as hydrogen may be added to either or both polymerization stages to alter the properties of the polymer product. Such modifiers are well known in the art and need not be discussed in any further detail since they form no part of this invention.

In commercial use the process of this invention is preferably carried out in continuous fashion, i.e. monomer feed and catalyst components are continuously fed to the first stage reactor and slurry of polymer product in liquid propylene is withdrawn continuously or "pseudo"-continuously from the last stage reactor. The prepolymerization reaction slurry from the first stage reactor is fed directly to the second reactor without any intermediate treatment, and sufficient ethylene and propylene (if needed) are fed to the second reactor to obtain the desired ethylene concentration in the liquid phase for contact with the prepolymer product. The relative proportions of liquid monomer to prepolymer in the post block reactor is adjusted to provide a solids content of the slurry of from about 5 to 60 wt %, preferably between about 20 and about 40 wt %.

The slurry withdrawn from the second reactor is separated into polymer product and unreacted monomer, which is advantageously returned to the reaction system. Because of the generally high productivity of the supported catalyst system expressed in terms of pounds of polymer produced per pound of titanium metal, there is no need to remove catalyst residues from the polymer in a deashing step as is the case with conventional catalyst.

Various additives can, if desired, be incorporated into the polypropylene resin, such as fibers, fillers, antioxidants, metal deactivating agents, heat and light stabilizer, dyes, pigments, lubricants and the like.

The polymers can be used with advantage in the manufacture of fibers, filaments and films by extrusion; of rigid articles by injection molding; and of bottles by blow molding techniques.

The following examples further illustrate the advantages obtained by the invention.

EXAMPLES 1-4 AND COMPARATIVE EXAMPLE 5

Each of the experiments was carried out in a 1 liter stainless steel stirred autoclave. 30 cc of a hexane solution containing 1.8 millimole of triisobutylaluminum (TIBA) and 0.6 millimole of methyl-p-toluate (MPT) were charged into the reactor followed by 0.5 cc of a mineral oil slurry (4% w/w) of magnesium chloride-supported titanium chloride catalyst components, under a propylene atmosphere at 25° C. The titanium catalyst was a commercially available catalyst which contained about 1.5 wt % titanium, 20.3 wt % magnesium, 60.0 wt % chlorine and 9.6 wt % hydrocarbon volatiles. Ethylbenzoate had been used in the manufacture of the supported titanium chloride catalyst component. 1 mole % hydrogen (based on the total moles of monomer feed) was added to the reactor followed by 300 gms of liquid propylene. The temperature was then raised to 60° C. and the first stage polymerization was carried out for a predetermined length of time indicated in Table I. Ethylene gas was then added. The pressure of ethylene was maintained at a constant value until the end of the copolymerization at which time all the monomers were vented and the polymer powder recovered.

The pertinent data are listed in Table I. The results indicate that the Izod value is related to the prepolymerization residence time; shorter prepolymerization times give rise to higher Izod values. Lowering the ethylene pressure (=lowering the ethylene concentration in the liquid phase) improves the Izod value although the ethylene content of the resultant copolymers is reduced.

It is obvious to those skilled in the art that many variations and modifications can be made to the process and the block copolymer of this invention. All such departures from the foregoing specification are considered within the scope of this invention as defined by the specification and the appended claims.

TABLE I

| Example | Homopolymerization time (mins) | Ethylene pressure (psi) | Ethylene Conc. (mol %) | Copolymerization time (mins) | Productivity (Kg PP/gm Ti) | Ethylene (%) | Notched Izod (1) (ft/lbs/in) |
| --- | --- | --- | --- | --- | --- | --- | --- |
| 1 | 15 | 50 | 1 | 105 | 461 | 14.2 | 6.4 |
| 2 | 30 | 50 | 1 | 60 | 582 | 16.6 | 5.1 |
| 3 | 15 | 150 | 10 | 105 | 540 | 25.4 | 3.7 |
| 4 | 25 | 150 | 10 | 95 | 535 | 27.6 | 3.4 |
| Comp. 5 | 60 | 50 | 1 | 60 | 382 | 1.3 | 0.7 |

(1) Izod measurements made from compression molded powder specimens at standard test temperature of 23° C.

What is claimed is:

1. A block copolymerization process for the production of impact resistant ethylene-propylene block polymers at high productivity rates, which comprises
   I. in a first stage producing a propylene prepolymer in the presence of no more than about 5 vol % of inert diluents by polymerizing propylene at pressures sufficient to maintain propylene in liquid phase, at a residence time of about 30 minutes or below and at temperatures between about 115° F. and about 165° F. in the presence of a catalyst composition containing the components
      (a) an aluminum trialkyl or an aluminum trialkyl at least partially complexed with an electron donor compound, and
      (b) titanium tri- or tetrahalide supported on magnesium dihalide, or a complex of a titanium tri- or tetrahalide with an electron donor compound supported on magnesium dihalide, the components (a) and (b) being provided in a molar ratio of Al/Ti between about 10 and about 400;
   II. in a second stage contacting the prepolymer of the first stage with a monomer mixture of ethylene and propylene at a pressure sufficient to maintain propylene in liquid phase, at a temperature between about 115° F. and about 165° F., a residence time of between about 30 and about 450 minutes in the substantial absence of inert diluents, and
   III. separating the product of Step II from the unreacted monomer.

2. A process according to claim 1 wherein the residence time of the first step is maintained between about 5 and about 20 minutes.

3. A process according to claim 1, wherein the ethylene content of the monomer mixture of ethylene and propylene in the second stage is maintained between about 0.5 and about 6 mole%.

4. A process according to claim 3, wherein said content is between about 1 and about 4 mole %.

5. A process according to claim 1, wherein the polymerization temperature of either stage is between about 125° F. and about 155° F.

6. A process according to claim 1, wherein the propylene prepolymer is propylene homopolymer.

7. A process according to claim 1, wherein the propylene prepolymer is random copolymer of ethylene and propylene.

8. A process according to claim 1, wherein the aluminum trialkyl is one containing from 1 to 8 carbon atoms in the alkyl groups.

9. A process according to claim 1, wherein the aluminum trialkyl is triisobutyl aluminum.

10. A process according to claim 1, herein the electron donor compound of component (a) of the catalyst composition is an ester of a carboxylic acid or a diamine.

11. A process according to claim 10, wherein said electron donor is an ester of an aromatic acid.

12. A process according to claim 11, wherein the ester is methyl-p-toluate.

13. A process according to claim 1, wherein the molar ratio of trialkyl aluminum to electron donor ranges between about 1 and about 100.

14. A process acccording to claim 13, wherein the molar ratio is between about 2 and about 5.

15. The process of claim 1, wherein component (a) is prepared by prereacting the aluminum trialkyl with the electron donor for for less than one hour prior to polymerization.

16. The process of claim 1, wherein the titanium tri- or tetrahalide is a titanium trichloride of titanium tetrachloride.

17. The process of claim 1, wherein the magnesium dihalide is magnesium dichloride.

18. The process of claim 1, wherein the electron donor compound of component (b) is a polyamine or an ester of an inorganic or an organic oxygenated acid.

19. The process of claim 18, wherein said electron donor is an ester of an aromatic carboxylic acid.

20. The process of claim 19, wherein the ester is ethylbenzoate.

21. The process of claim 1, wherein the magnesium to electron donor molar ratio of component (b) is at least about 1.

22. The process of claim 21, wherein said molar ratio is between about 2 and about 10.

23. The process of claim 1, wherein the titanium content expressed as titanium metal ranges between about 0.1 and about 20 weight percent in the supported catalyst component (b).

24. The process of claim 23, wherein the titanium content is between about 1 and about 3 weight percent.

* * * * *